United States Patent [19]
Adams

[11] Patent Number: 5,660,407
[45] Date of Patent: Aug. 26, 1997

[54] AUXILIARY CHAIN TENSION SYSTEM FOR BICYCLES

[76] Inventor: Joseph Scott Adams, P.O. Box 560, Big Bear City, Calif. 92314

[21] Appl. No.: 520,321

[22] Filed: Aug. 28, 1995

[51] Int. Cl.⁶ .................... B62J 39/00; F16H 7/00
[52] U.S. Cl. .................. 280/288.4; 474/80; 474/82; 474/101; 474/117; 474/133; 280/236
[58] Field of Search ................ 280/288.4, 236, 280/238, 259, 260; 474/80, 82, 113, 116, 117, 133, 134, 135, 101

[56] References Cited

U.S. PATENT DOCUMENTS

| 2,108,941 | 2/1938 | Morgan | 474/80 |
| 5,207,619 | 5/1993 | Klein et al. | 474/101 |
| 5,397,275 | 3/1995 | McJunkin, Jr. | 280/304.1 X |
| 5,518,458 | 5/1996 | Liu | 474/111 |

FOREIGN PATENT DOCUMENTS

| 827046 | 4/1938 | France | 474/80 |
| 407548 | 3/1934 | United Kingdom | 474/80 |

Primary Examiner—Brian L. Johnson
Assistant Examiner—Victor E. Johnson
Attorney, Agent, or Firm—Loeb & Loeb LLP

[57] ABSTRACT

An auxiliary chain tension system for a rear derailleur in a bicycle, the auxiliary chain tension system being composed of: an elongated member having two opposed ends, one end being formed to secure the member in a fixed position relative to the rear wheel fork of the bicycle so that the other end extends rearwardly from the rear wheel fork, the other end of the elongated member being formed to retain; a spring retention member securable to a pulley shield of the derailleur; and a tension spring having a first end connectable to the other end of the elongated member and a second end connectable to the spring retention member for imposing an auxiliary tension force on the bicycle drive chain.

7 Claims, 2 Drawing Sheets

AUXILIARY CHAIN TENSION SYSTEM FOR BICYCLES

BACKGROUND OF THE INVENTION

The present invention relates to derailleur type bicycles, exemplified by racing bicycles and mountain bicycles, and particularly relates to control of the drive chain in such bicycles.

Bicycles of the type described above contain a gear shifting mechanism which includes a derailleur that is operated by the rider to shift the drive chain from one sprocket wheel to another, to thereby vary the bicycle transmission ratio, i.e. the ratio between the rate of rotation of the pedals and the rate of rotation of the bicycle wheels.

Proper operation of the transmission requires that the chain be maintained under adequate tension at all times. For this purpose, existing derailleurs always include some form of chain tensioning component. Since derailleurs are mass produced, the tension setting must be selected in anticipation of use by an average rider under average conditions. However, there are situations where the designed chain tension is not adequate to the conditions at hand. The preset tension (preset for the average rider) in typical mass produced derailleurs may not be adequate for rough terrain, high speeds or "chainsuck" (when the chain catches on a front chainring and becomes jammed) conditions. Moreover, the preset tension may be not adequately prevent "chain slap" (when the chain slaps against the frame) which can damage the frame tubing or paint.

SUMMARY OF THE INVENTION

It is an object of the present invention to permit the tension of the drive chain of such bicycles to be readily varied to better suit individual conditions and requirements.

Another object of the invention is to provide an attachment which is structurally simple and easy to install and enables the tension on the drive chain of such a bicycle to be increased by a selected amount.

The above and other objects are achieved according to the present invention, by the provision of an auxiliary chain tension system for a rear derailleur in a bicycle, the bicycle having a frame provided with a rear wheel fork having a slot, a rear wheel having an axle received in the slot, means for securing the axle to the fork and a chain for transmitting motive force to the rear wheel, the derailleur having a rotatable tension pulley, pulley support means supporting the pulley for movement relative to the frame, a pulley shield at least partially surrounding the pulley and means connected for applying a force for moving the pulley in a direction to maintain a predetermined tension in the chain, the auxiliary chain tension system comprising: an elongated member having two opposed ends and provided at one end with means for securing the member in a fixed position relative to the rear wheel fork so that the other end extends rearwardly from the rear wheel fork, the other end of the member being provided with spring engaging means; a spring retention member securable to the pulley shield; and a tension spring having a first end connectable to the spring engaging means and a second end connectable to the spring retention member for applying a biassing force to the pulley support means in a direction to impose an auxiliary tension force on the chain.

DESCRIPTION OF THE PREFERRED EMBODIMENTS

Figure 1:
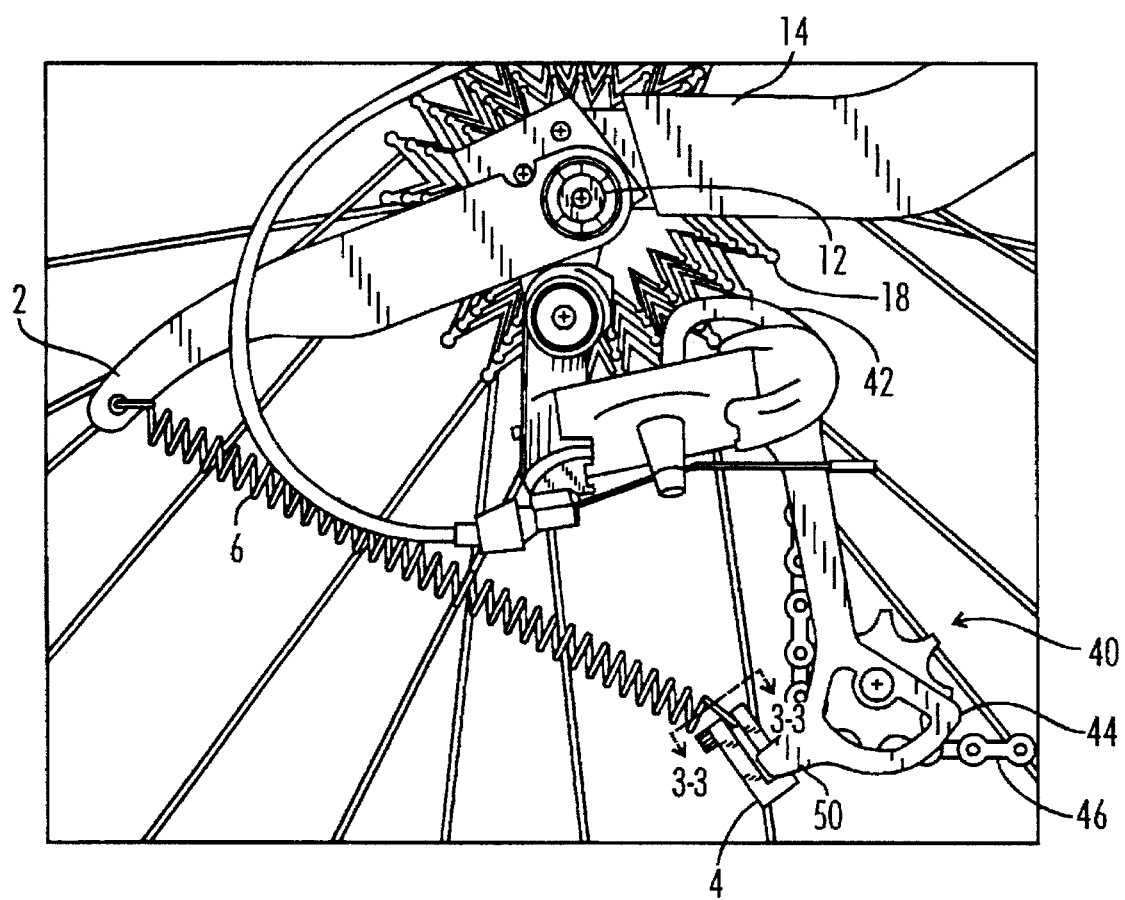
FIG. 1 is a side elevational, pictorial view showing one preferred embodiment of the tensioning system according to the invention installed on a mountain bicycle.
Figure 2:
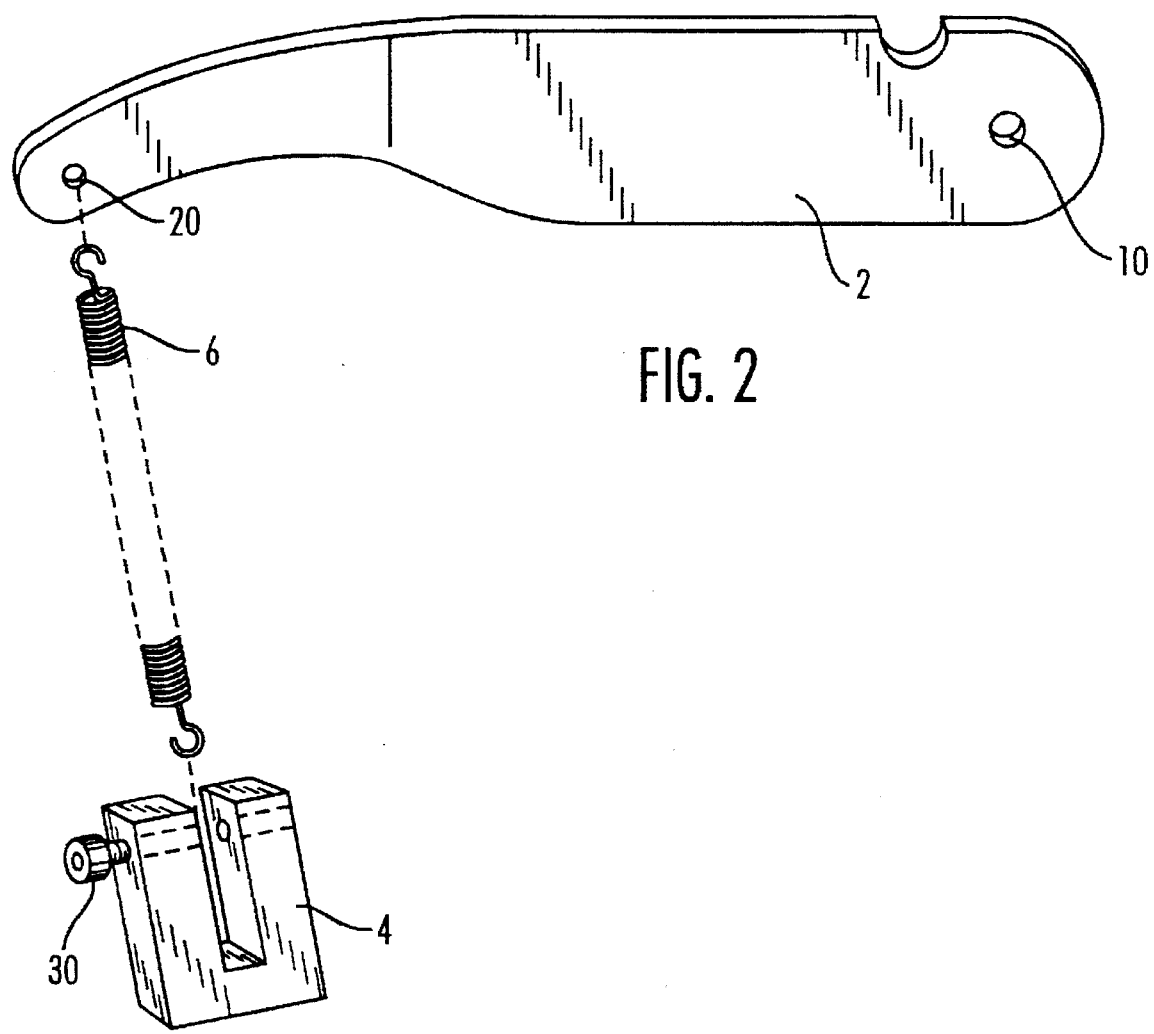
FIG. 2 is an exploded view of components of the system shown in FIG. 1.
Figure 3:
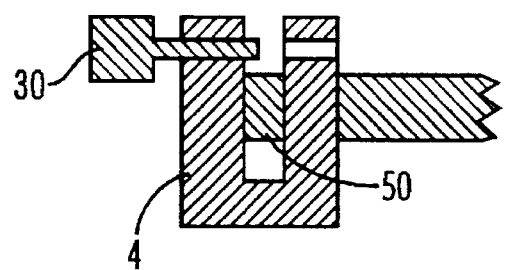
FIG. 3 is a cross-sectional view, along the line 3—3 of FIG. 1, of a second component of the system shown in FIG. 1.

FIGS. 1, 2 and 3 show a preferred embodiment of an auxiliary chain tension system according to the invention installed on the rear wheel assembly of a mountain bicycle. The assembly essentially includes an elongated member in the form of a tension bar 2, a spring retention member in the form of a retention clip 4, and a helical tension spring 6 connected between tension bar 2 and clip 4.

Tension bar 2 is provided, at one end, with a mounting hole 10, which is installed over the rear wheel axle 12 of the bicycle. Axle 12 is mounted, as is conventional, in a fork 14 forming part of bicycle frame 16.

Tension bar 2 is held in place by tightening a nut (not shown) which is normally provided on axle 12 to hold the rear wheel of the bicycle in place. The rear wheel also carries, as is conventional, a plurality of sprocket wheels, one of which is shown at 18. Hole 10 in tension bar 2 is dimensioned to permit the tension bar to be mounted on bicycles having solid rear wheel axles.

The end of tension bar 2 which is remote from hole 10, and which faces rearwardly of the bicycle, is provided with a spring receiving hole 20 into which a loop at one end of spring 6 is hooked.

Clip 4 is basically a U-shaped member, which may have a square or rectangular cross-section in a plane perpendicular to the planes of both FIG. 1 and FIG. 3. The U-shaped member forming clip 4 has a groove which is open on three sides. Clip 4 is provided, in one leg of the U-shaped member and at one end of clip 4, with a threaded opening (not visible) which threadedly engages with a threaded bolt 30.

The bicycle further includes a rear derailleur 40, which can be of any conventional type. Such rear derailleurs typically include, as shown, a guide pulley 42 and a tension pulley 44. A bicycle drive chain 46 guided around pulleys 42 and 44 and around a selected sprocket wheel 18 along the path shown in FIG. 1.

A conventional derailleur is constructed to have a component 48, such as a torsion spring, which act on tension pulley 44 in order to place the drive chain under tension.

Since the tension produced by the derailleur tensioning components is frequently not sufficient for many situations, the present invention allows that tension to be increased by installing tension bar 2 and clip 4, as described above, and connecting a selected tension spring 6 between hole 20 and tension bar 2 and bolt 30 of clip 4.

Known derailleurs also include various housing components which may include a projecting element, such as the tab 50 shown in FIG. 1, which may be introduced into the groove provided by clip 4 when bolt 30 has been retracted to leave the free end of that groove unobstructed. Such a derailleur structure may also include a projection which would serve to retain clip 4 in position as shown in FIGS. 1 and 3.

One known derailleur having the structure illustrated in FIG. 1 and described above is marketed by Shimano Inc. under the trademark DEORE XT.

After clip 4 has been installed on derailleur 40, one end of spring 6 is positioned so that when bolt 30 is advanced into the gap between the two halves of clip 4, the free end of bolt 30 passes through a loop at the associated end of spring 6 and is advance across the groove in clip 4, thus acting to secure the spring to clip 4.

In further accordance with the invention, the auxiliary chain tension system according to the invention would be provided with a plurality of springs having different spring constants for reuse under different conditions. For example, a lighter spring would be provided for use during cross-country or all-around riding, while a stronger spring would be provided for use in downhill racing.

Preferably, systems according to the invention should be provided with at least two different springs.

It has been found that the additional chain tension provided by the system according to the present invention is instrumental in eliminating, or reducing, incidents in which chain 46 disengages from a sprocket wheel, as well as incidents of chain slap and chain suck, which is a condition in which the chain is pulled up by the front chain ring or sprocket wheel to a point between that chain ring and a bottom bracket, resulting in jamming of the chain.

What is claimed is:

1. An auxiliary chain tension system for a rear derailleur in a bicycle, the bicycle having a frame provided with a rear wheel fork having a slot, a rear wheel having an axle received in the slot, means for securing the axle to the fork and a chain for transmitting motive force to the rear wheel, and the derailleur having a rotatable tension pulley, pulley support means supporting the pulley for movement relative to the frame, a pulley shield at least partially surrounding the pulley and means connected for applying a force for moving the pulley in a direction to maintain a predetermined tension in the chain, said auxiliary chain tension system comprising:

an elongated member having two opposed ends and provided at one end with means for securing said member in a fixed position relative to the rear wheel fork so that the other end extends rearwardly from the rear wheel fork, the other end of said elongated member being provided with spring engaging means;

a spring retention member securable to the pulley shield; and a tension spring having a first end connectable to said spring engaging means and a second end connectable to said spring retention member for applying a biassing force to the pulley support means in a direction to impose an auxiliary tension force on the chain.

2. A system as defined in claim 1 wherein said elongated member is constituted by a unitary bar provided at the one end with an opening for mounting on the rear wheel axle of the bicycle and provided at the other end with an opening constituting the spring engaging means.

3. A system as defined in claim 2 wherein said spring retention member is in the form of a clip presenting a groove having an open end and with a threaded passage adjacent to the open end, and said spring retention member further comprises a retention bolt engaging in said threaded passage and displaceable to extend across said groove and engage said second end of said tension spring.

4. In a bicycle having a rear derailleur, a frame provided with a rear wheel fork having a slot, means for securing the axle to the fork and a chain for transmitting motive force to the rear wheel, the derailleur having a rotatable tension pulley, pulley support means supporting the pulley for movement relative to the frame, a pulley shield at least partially surrounding the pulley and means for applying a force for moving the pulley in a direction to maintain a predetermined tension in the chain, the improvement comprising an auxiliary chain tension system comprising:

an elongated member having two opposed ends and provided at one end with means for securing said member in a fixed position relative to the rear wheel fork, the other end of said elongated member being provided with spring engaging means;

a spring retention member securable to the pulley shield; and a tension spring having a first end connectable to said spring engaging means and a second end connectable to said spring retention member for applying a biassing force to the pulley support means in a direction to impose an auxiliary tension force on the chain.

5. A bicycle as defined in claim 4 wherein said elongated member is constituted by a unitary bar provided at the one end with an opening for mounting on the rear wheel axle of the bicycle and provided at the other end with an opening constituting the spring engaging means.

6. A bicycle as defined in claim 5 wherein said spring retention member is in the form of a clip presenting a groove having an open end and with a threaded passage adjacent to the open end, and said spring retention member further comprises a retention bolt engaging in said threaded passage and displaceable to extend across said groove and engage said second end of said tension spring.

7. A bicycle as defined in claim 4 wherein said spring retention member is in the form of a clip presenting a groove having an open end and with a threaded passage adjacent to the open end, and said spring retention member further comprises a retention bolt engaging in said threaded passage and displaceable to extend across said groove and engage said second end of said tension spring.

* * * * *